(12) United States Patent
Kato et al.

(10) Patent No.: US 7,999,417 B2
(45) Date of Patent: Aug. 16, 2011

(54) ELECTRONIC DEVICE

(75) Inventors: Hiroshi Kato, Kanagawa (JP);
Kuniharu Suzuki, Tokyo (JP); Katsuya Suzuki, Gunma (JP); Manabu Yamazaki, Kanagawa (JP); Kota Onishi, Aichi (JP); Kentaro Yoda, Nagano (JP)

(73) Assignees: Sony Ericsson Mobile Communications Japan, Inc., Tokyo (JP); Seiko Epson Corporation, Tokyo (JP)

( * ) Notice: Subject to any disclaimer, the term of this patent is extended or adjusted under 35 U.S.C. 154(b) by 438 days.

(21) Appl. No.: 12/068,792

(22) Filed: Feb. 12, 2008

(65) Prior Publication Data

US 2008/0197711 A1 Aug. 21, 2008

(30) Foreign Application Priority Data

Feb. 20, 2007 (JP) ................. 2007-039183

(51) Int. Cl.
*H02M 7/06* (2006.01)
*H02M 7/217* (2006.01)
(52) U.S. Cl. ......... 307/149; 363/126; 363/127; 455/129
(58) Field of Classification Search .................. 307/149; 363/126, 127; 455/129
See application file for complete search history.

(56) References Cited

U.S. PATENT DOCUMENTS

| | | | | | |
|---|---|---|---|---|---|
| 5,949,155 | A | * | 9/1999 | Tamura et al. | 307/107 |
| 6,028,413 | A | * | 2/2000 | Brockmann | 320/108 |
| 6,118,249 | A | * | 9/2000 | Brockmann et al. | 320/108 |
| 6,301,128 | B1 | * | 10/2001 | Jang et al. | 363/17 |
| 6,487,100 | B2 | * | 11/2002 | Watanabe et al. | 363/127 |
| 6,831,378 | B2 | * | 12/2004 | Watanabe et al. | 307/149 |
| 6,844,702 | B2 | * | 1/2005 | Giannopoulos et al. | 320/108 |
| 6,934,167 | B2 | * | 8/2005 | Jang et al. | 363/21.02 |
| 7,505,794 | B2 | * | 3/2009 | Watanabe et al. | 455/572 |
| 7,554,316 | B2 | * | 6/2009 | Stevens et al. | 323/355 |
| 2006/0239043 | A1 | * | 10/2006 | Ohbo | 363/25 |

FOREIGN PATENT DOCUMENTS

| | | |
|---|---|---|
| JP | 04-125017 A | 4/1992 |
| JP | 11-164497 A | 6/1999 |
| JP | 11-187582 | 7/1999 |
| JP | 11-332135 A | 11/1999 |
| JP | 2002-084686 A | 3/2002 |

* cited by examiner

*Primary Examiner* — Bao Q Vu
(74) *Attorney, Agent, or Firm* — Rader, Fishman & Grauer PLLC (57) ABSTRACT

An electronic device having at least a loop-shaped electric conductor generating electric power by electromagnetic induction is provided. The electronic device includes a voltage-detecting unit, a voltage-comparing unit and a separating unit. The voltage-detecting unit is configured to detect a voltage generated in the electric conductor by the electromagnetic induction. The voltage-comparing unit is configured to make a comparison between the voltage detected by the voltage-detecting unit and a predetermined reference voltage and determining whether the voltage detected by the voltage-detecting unit exceeds the predetermined reference voltage. The separating unit is configured to break an electric connection between the electronic conductor and an electronic circuit connecting to the electric conductor when the voltage-comparing unit determines that the voltage detected by the voltage-detecting unit exceeds the predetermined reference voltage.

20 Claims, 7 Drawing Sheets

ELECTRONIC DEVICE

CROSS-REFERENCES TO RELATED APPLICATIONS

The present invention contains subject matter related to Japanese Patent Application JP 2007-039183, filed in the Japanese Patent Office on Feb. 20, 2007, the entire contents of which are incorporated herein by reference.

BACKGROUND OF THE INVENTION

1. Field of the Invention

The present invention relates to an electronic device including at least a loop-shaped electric conductor generating electric power by electromagnetic induction.

2. Description of the Related Art

For example, a system for transmitting charge power for charging a rechargeable battery incorporated in a portable terminal using electromagnetic induction with a noncontact power-transmission coil has been known.

In addition, Japanese Unexamined Patent Application Publication No. H11-187582 (FIG. 1 and FIG. 4) discloses a technology for stabilizing a secondary output voltage as follows. In a system for carrying out electric-power transmission by electromagnetic induction using a transformer, information about the secondary output voltage of a secondary circuit on the power-receiving side is fed back to a primary circuit on the power-transmission side. Based on the feed-back information about the secondary output voltage, the primary circuit carries out suitable control of power transmission to stabilize the secondary output voltage.

SUMMARY OF THE INVENTION

In a noncontact-charging system, for example, electric power transmitted from a primary transmission coil of a cradle is received by a secondary transmission coil of a portable terminal to charge a built-in rechargeable battery of the portable terminal. In this case, the electric power transmitted from the cradle to the portable terminal is only about 2 to 3 watts (W). The voltage generated from the secondary transmission coil of the portable terminal may be about 24 volts (V) at a maximum.

Figure 1:
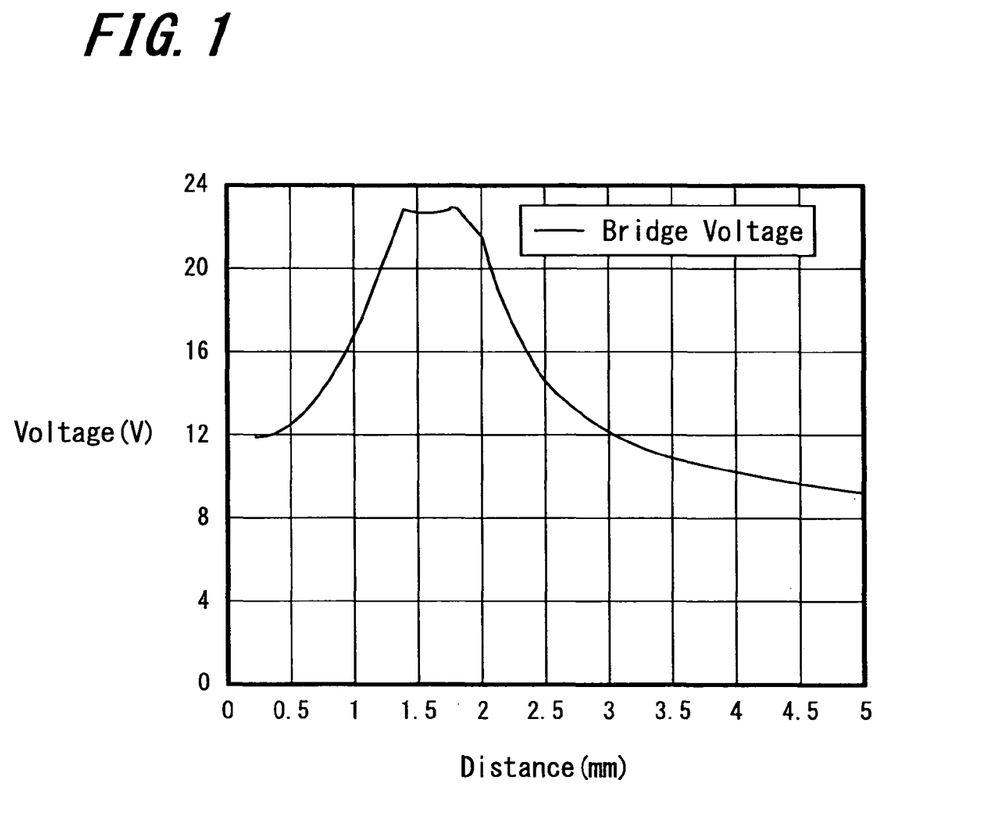
FIG. 1 is a schematic diagram illustrating an example of a voltage (rectified bridge voltage) generated in a secondary transmission coil mounted on a portable terminal at the time of noncontact charging.

FIG. 1 represents an example of a voltage generated by a secondary transmission coil mounted on a portable terminal when the noncontact charging is carried out (rectified bridge voltage). In other words, the voltage generated from the secondary transmission coil varies depending on the positional relationship or distance between a cradle and a primary transmission coil. In general, it may be about 24 V at a maximum as shown in this example. Therefore, among the electronic circuits mounted on the portable terminal, the resistance voltages of the respective circuits subsequent to the secondary transmission coil may be about 50 V.

On the other hand, induction heating cookers have become popular in recent years. The induction heating cooker can generate powerful magnetic fields and the transmitted electric power can be up to about 2 kW to 3 kW.

When the portable terminal is carelessly brought close to such an induction heating cooker, a strong magnetic field generated from the induction heating cooker may cause the a voltage of several hundreds volts to be generated on the secondary transmission coil of the portable terminal. In such a case, a voltage as high as several hundreds volts is generated from the secondary transmission coil, thereby destroying the inner electronic circuit of the portable terminal.

Figure 2:
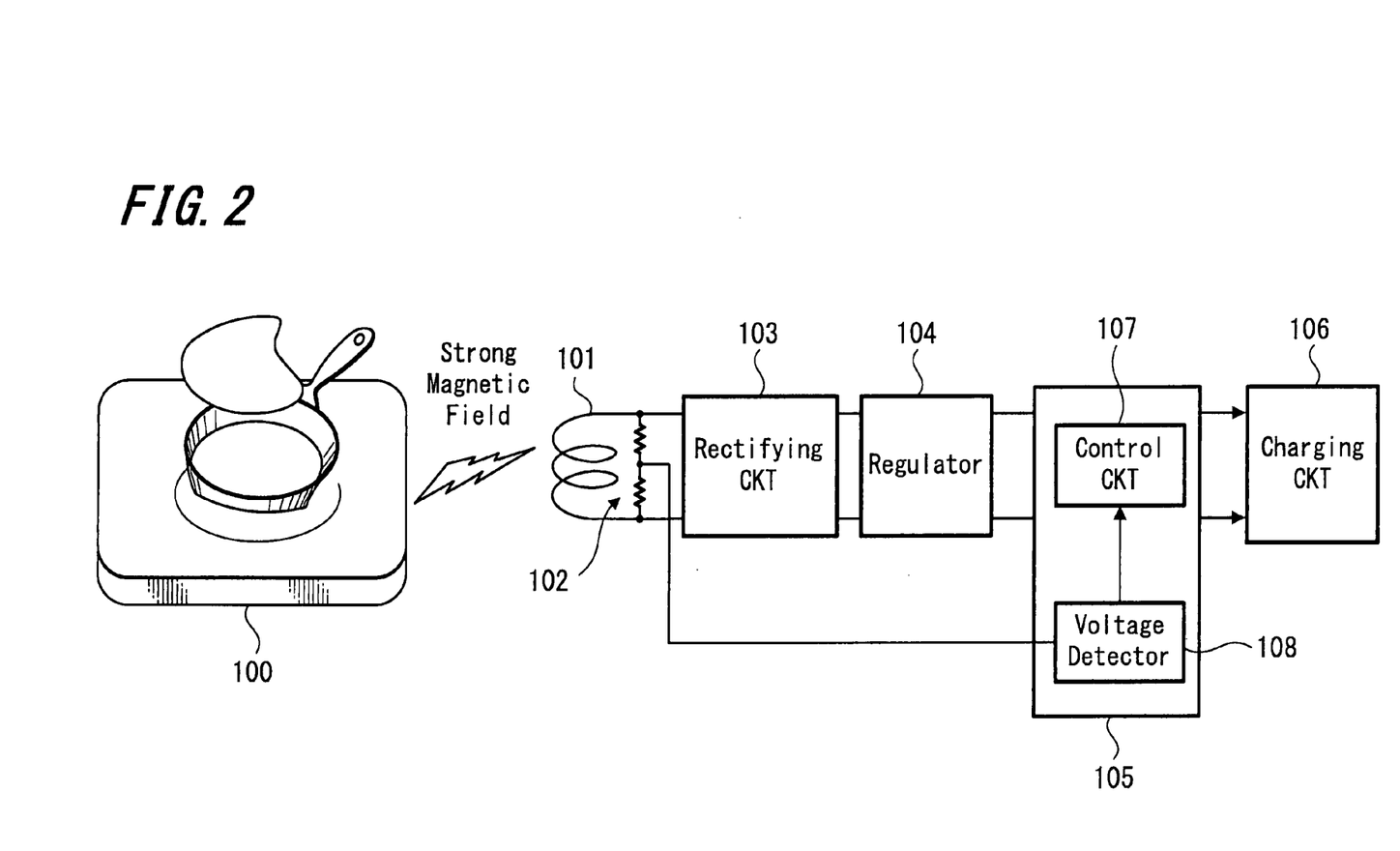
FIG. 2 is a block diagram illustrating a principal circuit configuration around the secondary transmission coil of the related-art portable terminal and illustrating an induction heating cooker with a strong magnetic field generated from the cooker.

FIG. 2 represents a principal circuit configuration around the secondary transmission coil of the portable terminal and also represents an induction heating cooker 100 and a strong magnetic field generated therefrom.

The portable terminal shown in FIG. 2 is provided with a voltage-dividing resistor 102 on the output side of a secondary transmission coil 101 of the portable terminal. The voltage-divided output from the voltage-dividing resistor 102 is transmitted to a voltage detector 108 of a charging-voltage control unit 105.

In addition, the output (alternating voltage) of the secondary transmission coil 101 is converted into a direct current voltage by a rectifying circuit 103 and then converted into a predetermined voltage level by a regulator 104, followed by transmitting to the charging-voltage control unit 105.

The control circuit 107 of a charging-voltage control unit 105 determines whether a voltage level detected by a voltage detector 108 is within a predetermined voltage range. If the detected voltage level of the voltage detector 108 is within the predetermined voltage range, then the charging electric power is supplied to a portable terminal charging circuit 106. On the other hand, if the detected voltage level is out of the predetermined voltage range, it is controlled so that the supply of a charging-voltage to the portable terminal charging circuit 106 will not be carried out. The control circuit 107 is able to carry out other processes. However, the description thereof is herein omitted.

The secondary transmission coil 101 of the portable terminal having the circuit configuration as shown in FIG. 2 may be subjected to, for example, a strong magnetic field from the induction heating cooker 100. In this case, for example, an alternating voltage as high as several hundreds voltages is output from the above secondary transmission coil 101. In addition, a high direct current voltage may be output to the subsequent stage of the configuration of the above rectifying circuit 103. In this case, the regulator 104 and the subsequent circuits, that is, the later part of the rectifying circuit 103 may be broken.

Any of high resistance voltage parts, which resist several hundreds volts, may be mounted as an internal electronic circuit of the portable terminal. However, these high resistance voltage parts are expensive and larger than desired dimensions. In addition, attention may be paid so as not to bring the portable terminal close to such an induction heating cooker. However, for example, when such induction heating cooker is incorporated in a table at a restaurant or the like, it is also possible to bring the portable terminal close to the induction heating cooker without noticing.

It is desirable to provide an electronic device including a coil for noncontact power transmission without any of expensive and large-size high-resistance voltage parts, while being capable of protecting inner electronic circuits from damaging. It is desirable to provide an electronic device, inner electronic circuits of which can be protected, for example, even in the case where a high voltage output is generated from a coil due to an induction heating cooker or the like by being subjected to a strong magnetic field or a strong electromagnetic wave from the induction heating cooker or the like.

According to an embodiment of the present invention, there is provided an electronic device having at least a loop-shaped electric conductor generating electric power by electromagnetic induction. The electronic device includes a voltage-detecting unit, a voltage-comparing unit, and separating unit. The voltage-detecting unit is configured to detect a voltage generated in the electric conductor by the electromagnetic induction. The voltage-comparing unit is configured to make a comparison between the voltage detected by the voltage-detecting unit and a predetermined reference voltage and determining whether the voltage detected by the voltage-detecting unit exceeds the predetermined reference voltage. The separating unit is configured to break an electric connection between the electronic conductor and an electronic circuit connecting to the electric conductor when the voltage-comparing unit determines that the voltage detected by the voltage-detecting unit exceeds the predetermined reference voltage.

Specifically, according to the embodiment of the present invention, the loop-shaped electric conductor outputs an abnormally high voltage as a result of being exposed to a strong magnetic field or a strong electromagnetic wave from the induction heating cooker or the like. The abnormally high voltage is then detected by the voltage-comparing unit. Subsequently, the separating unit breaks an electrical connection between the electric conductor and the electronic circuit connected thereto.

According to the embodiment of the present invention, an electrical connection between the electric conductor and the electronic circuit is broken when the loop-shaped electric conductor outputs a voltage not smaller than a reference voltage. Accordingly, if the electronic device is subjected to a strong magnetic field or a strong electromagnetic wave caused by an induction heating cooker or the like and a high voltage may be output from the loop-shaped electric conductor (e.g., noncontact power transmission coil), it is possible to protect inner electronic circuits from damaging without any of expensive large-size high-resistance voltage parts.

DESCRIPTION OF THE PREFERRED EMBODIMENTS

Hereinafter, an embodiment of the present invention will be described with reference to the attached drawings.

In this embodiment, for example, a mobile phone unit, on which a noncontact power-transmission coil formed of a spiral planar coil is mounted, is provided as an example of an electronic device including at least a loop-shaped electric conductor that generates electric power by electromagnetic induction. In addition, as an example of a battery charger for the mobile phone unit, a cradle is provided. Needless to say, any content described herein is only provided as an example and the present invention is thus not limited to such an example.

[General Configurations of Cradle and Mobile Phone Unit and Their Basic Actions in Charging]

Figure 3:
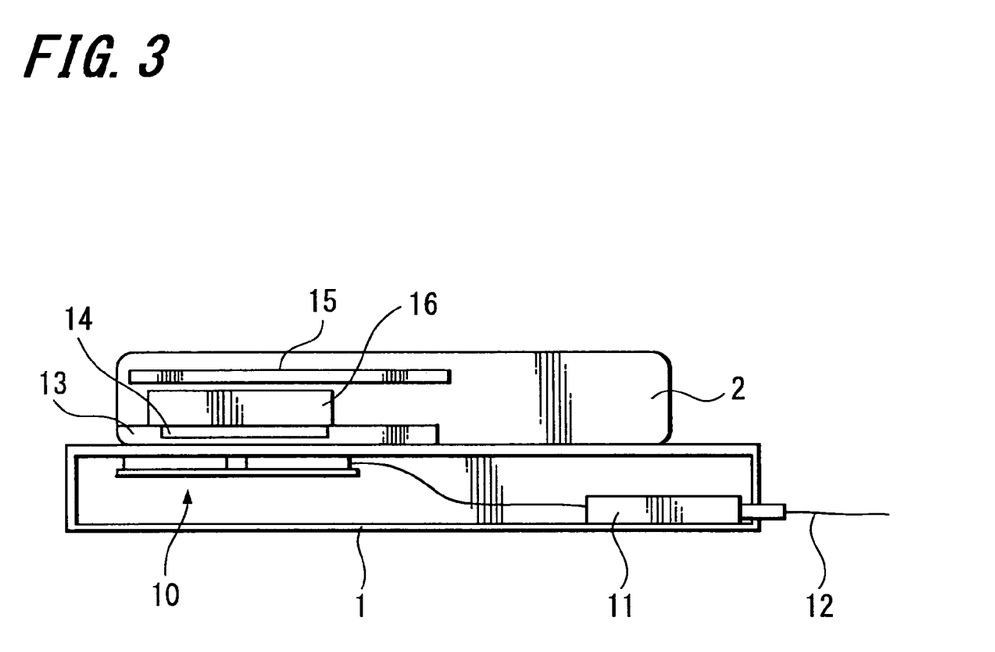
FIG. 3 is a schematic diagram illustrating an inner structure of principal parts of a mobile phone unit and a cradle in accordance with an embodiment of the present invention.

FIG. 3 is a diagram that schematically illustrates the configuration of principal parts of a mobile phone unit 2 and the configuration of principal parts of a cradle 1, which are related to noncontact power transmission.

The mobile phone unit 2 of the present embodiment includes a battery 16, a secondary power-transmission coil 14, a circuit board 15, and a housing in which these structural components are housed. Specifically, the battery 16 includes at least a rechargeable battery that generates the operating power of the mobile phone unit 2. The secondary power-transmission coil 14 is provided as a noncontact power-transmission coil on the power-receiving side for charging the battery 16. Furthermore, various electronic circuits are mounted on the circuit board 15. The electronic circuits include a charge-control circuit that charges the battery 16 by supplying the electric power received through the secondary power-transmission coil 14 to the battery 16. Furthermore, in the present embodiment, the illustration and the description of other structural components such as those typically installed in any related-art mobile phone unit are omitted.

The battery 16 is detachably mounted on the mobile phone unit 2. The mobile phone unit 2 is provided with a battery cover 13 to be closed and opened (or detached or attached) when the battery 16 is detached from or attached to the mobile phone unit 2.

The secondary power-transmission coil 14 is formed of a planar coil in which a linear conductor having electrical conductivity is spirally formed. One planar surface of the secondary power-transmission coil 14 is stuck on the inner wall of the battery cover 13 or on the outer surface of the battery 16 on the battery cover side. In the present embodiment, the secondary power-transmission coil 14 is stuck on the inner wall of the battery cover 13.

On the other hand, the cradle 1 of the present embodiment includes a primary transmission coil 10, a control board 11, a power-supply cord 12, and a housing in which these structural components are housed. The primary transmission coil 10 is provided as a noncontact power-transmission coil on the power-transmission side for charging the battery 16 of the mobile phone unit 2. The control board 11 supplies and controls electric power to the primary transmission coil 10. In addition, the power-supply cord 12 is, for example, one to be connected to a consumer power supply system. Illustration and description of other structural components provided with common cradles are herein omitted.

As in the case of the secondary transmission coil 14 of the mobile phone unit 2, the primary transmission coil 10 of the cradle 1 is a planar coil in which a linear conductor with electrical conductivity is spirally formed. One flat surface of the primary transmission coil 10 is stuck on the inner wall of the terminal-mounting base of the cradle 1.

The control board 11 is allowed to detect a voltage change in response to a change in magnetic field of the primary transmission coil 10. The change in magnetic field occurs when the mobile phone unit 2 is placed on the terminal-mounting base of the cradle 1 and the secondary transmission coil 14 of the mobile phone unit 2 is then closely arranged to the primary transmission coil 10 of the cradle 1. Furthermore, the control board 11 determines that the mobile phone unit 2 is placed on the terminal-mounting base of the cradle 1 when a predetermined voltage level is detected. The predetermined voltage level is caused by a change in voltage in response to a change in magnetic field of the primary transmission coil 10 when the secondary transmission coil 14 is closely arranged.

Similarly, the charge-control circuit of the mobile phone unit 2 of the present embodiment is capable of detecting the change in voltage in response to the change in magnetic field in the secondary transmission coil 14. Accordingly, when the mobile phone unit 2 is placed on the terminal-mounting base of the cradle 1, the secondary transmission coil 14 is closely arranged to the primary transmission coil 10 of the cradle 1, thereby detecting the change in magnetic field. Furthermore, the charge-control circuit of the mobile phone unit 2 determines that the unit 2 is placed on the terminal-mounting base of the cradle 1 when a predetermined voltage level is detected. The predetermined voltage is caused by a change in voltage in response to a change in magnetic field of the secondary transmission coil 14 when the primary transmission coil is closely arranged.

Furthermore, in the present embodiment, both the cradle 1 and the mobile phone unit 2 are designed to be capable of transmitting information through the primary transmission coil 10 and the secondary transmission coil 14, respectively. For example, when the mobile phone unit 2 is placed on the terminal-mounting base of the cradle 1, they mutually detect a close arrangement of the primary coil 10 and the secondary coil 14 on the basis of a change in magnetic field as described above. At this time, the cradle 1 and the mobile phone unit 2 exchange identification information for authenticating the counterpart by transmitting the information through the primary transmission coil 10 and the secondary transmission coil 14, respectively.

Furthermore, in the present embodiment, both the cradle 1 and the mobile phone unit 2 detect the close arrangement of the primary transmission coil 10 and the secondary transmission coil 14. Furthermore, when the cradle 1 and the mobile phone unit 2 recognize each other, the cradle 1 is then allowed to transmit electric power to the mobile phone unit 2. Subsequently, the battery 16 of the mobile phone unit 2 is charged with the transmitted electric power.

As described above, when the charging of the battery 16 of the mobile phone unit 2 is started as described above, the control board 11 of the cradle 1 converts a consumer alternating voltage supplied through the power-supply cord 12 into a predetermined direct current voltage. An alternating voltage at a predetermined frequency is generated using the direct current voltage and the generated alternating voltage is then supplied to the primary transmission coil 10.

On the other hand, when an alternating voltage is induced by the secondary transmission coil 14 with the alternating voltage from the primary transmission coil 10 of the cradle 1, the mobile phone unit 2 rectifies the induced alternating voltage and then converts it into a direct current voltage, followed by charging the battery 16 with the direct current voltage.

Furthermore, in the present embodiment, the control board 11 of the cradle 1 may determine that the change in magnetic field of the primary transmission coil 10 is generated because, for example, a metal substance, such as a coin, or any of other substances with electrical conductivities is placed on the terminal-mounting base and terminate the supply of electric power to the primary transmission coil 10. Such a determination is carried out in the case that a voltage level based on a change in electric field of the primary transmission coil 10 has not reached to a predetermined voltage level. Further, even when a voltage level based on a change in electric field of the primary transmission coil 10 has reached to a predetermined voltage level, such determination is carried out in the case where one end could not recognize the other end on the basis of the identification information thereof.

Furthermore, in the present embodiment, when the battery 16 of the mobile phone unit 2 is being charged by transferring electric power from the cradle 1, the transmission of charging information is carried out between the cradle 1 and the mobile phone unit 2 through the primary transmission coil 10 and the secondary transmission coil 14. In other words, the charge-control circuit of mobile phone unit 2 transmits the charging information of the battery 16 of the mobile phone unit 2 to the cradle 1 when the battery 16 is being charged by the electric power transmission from the cradle 1. The control board 11 of the cradle 1 monitors the charging status of the battery 16 of the mobile phone unit 2 on the basis of the charging information transmitted from the unit 2. When the control board 11 obtains from the charging information the fact that the charging of the battery 16 has not been completed, the electric power transmission through the primary transmission coil 10 is carried on. In contrast, when the control board 11 obtains from the charging information the fact that the charging of the battery 16 has been completed, it carries out a control action to terminate the electric power transmission. In addition, for example, the control board 11 carries out a control action to terminate the electric power transmission upon receiving the information about a certain abnormality from the mobile phone unit 2.

[Inner Circuit Configurations of Mobile Phone Unit and Cradle]

Figure 4:
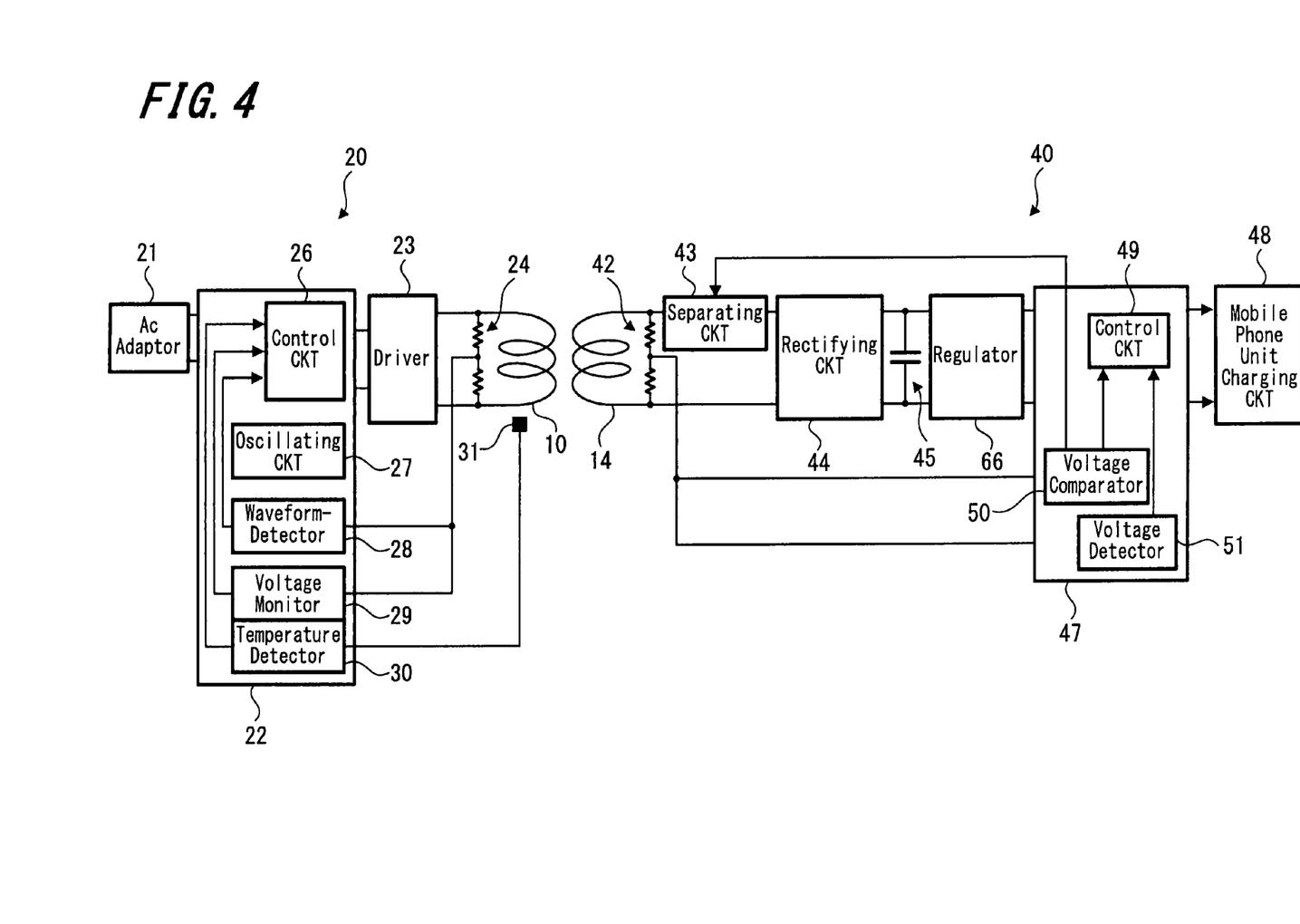
FIG. 4 is a block circuit diagram illustrating a detailed inner circuit configuration of principal parts related to a non-contact power transmission between a mobile phone unit and a cradle according to an embodiment of the present invention.

FIG. 4 illustrates a detailed inner circuit configuration of each of the principal part of the mobile phone unit 2 and the principal part of the cradle 1.

As shown in FIG. 4, the internal circuit 20 of the cradle 1 is included in the control board 11 shown in FIG. 3. The internal circuit 20 includes an AC adaptor 21, transmission power-control unit 22, and a driver 23 as principal components.

The AC adaptor 21 converts a consumer alternating voltage supplied through the above-mentioned power-supply cord 12 into a predetermined direct current voltage. The AC adaptor 21 supplies the direct current voltage to the driver 23 through the transmission power-control unit 22.

The driver 23 converts the direct current voltage into an alternating voltage at a predetermined frequency under the controls of the transmission power-control unit 22 and then supplies the alternating voltage to the primary transmission coil 10.

In addition, a voltage-dividing resistor 24 is connected between the coil ends of the primary transmission coil 10. The voltage-dividing resistor 24 is provided for dividing a voltage between the coil ends of the primary transmission coil 10 and transmitting the voltage-dividing output to the transmission power-control unit 22.

The transmission power-control unit 22 includes a control circuit 26, an oscillating circuit 27, a waveform-detector 28, a voltage monitor 29, and a temperature detector 30 as principal components.

The oscillating circuit 27 of the transmission power-control unit 22 generates a reference oscillation signal when transmitting a charging voltage from the cradle 1 to the mobile phone unit 2. Subsequently, the reference oscillation signal is output to the control circuit 26.

The waveform detector 28 receives the supply of output obtained by dividing the voltage between the coil ends of the primary transmission coil 10 by the voltage-dividing resistor 24. The waveform detector 28 detects a signal waveform of the voltage-divided output and then outputs A/D converted waveform data detected to the control circuit 26.

For transmitting a charging voltage from the cradle 1 to the mobile phone unit 2, the control circuit 26 controls the drive of the driver 23 based on the reference oscillation signal from the oscillating circuit 27. An alternating voltage at the predetermined frequency is supplied from the driver 23 to the primary transmission coil 10.

Furthermore, the control circuit 26 determines that the mobile phone unit 2 approaches to or separates from the above terminal-mounting base, determines the presence or absence of information transmission from the mobile phone unit 2 and extracts the contents of information. These operations are carried out based on the detected waveform data supplied through the voltage-dividing resistor 24 and the waveform-detector 28, or based on the detected waveform data of a voltage waveform generated between the coil ends of the primary transmission coil 10. In other words, from detected waveform data obtained through the voltage-dividing resistor 24 and the waveform-detector 28, the control circuit 26 extracts the contents of transmission information or the like by detecting a change in voltage generated in the primary transmission coil 10 with approach or separation of the mobile phone unit 2 to the above terminal-mounting base. Alternatively, it can be carried out by detecting a change in voltage generated in the primary transmission coil 10 when information transmission from the secondary transmission coil 14 of the mobile phone unit 2 is carried out. Furthermore, the control circuit 26 controls the supply and termination of alternating voltage to the primary transmission coil 10 from the driver 23, the frequency of alternating voltage to the primary transmission coil if required. It is carried out on the basis of: the approach or separation of the mobile phone unit 2 to the terminal-mounting base, the transmission information or the like supplied from the mobile phone unit 2, or the like.

The voltage monitor 29 observes whether the primary transmission coil 10 generates an unusual voltage out of the standard or whether such a generation is predicted on the basis of, for example, the voltage level from the voltage-dividing resistor 24. If the voltage monitor 29 detects the generation of unusual voltage out of the standard or the generation thereof is predicted, the information about such a fact is transmitted to the control circuit 26.

The temperature detector 30 observes whether the primary transmission coil 10 is at an unusual temperature out of the standard or whether such an unusual temperature is predicted. It is carried out, for example, based on a signal from a temperature sensor 31 mounted in the vicinity or in the inner side of the primary transmission coil 10. Furthermore, if the temperature detector 30 detects the unusual temperature out of the standard or predicts the unusual temperature, such a fact is transmitted to the control circuit 26.

Furthermore, the control circuit 26 may receive the information about the detection of abnormal voltage or the information about the detection of abnormal temperature at the time of or during the period of transferring the charging power from the cradle 1 to the mobile phone unit 2. In this case, the control circuit 26 controls the driver 23 to be paused and allows the supply of electric power to the primary transmission coil 10 to be terminated or prevented from initiating the supply.

In addition, as shown in FIG. 4, an inner circuit 40 of the mobile phone unit 2 is included in the circuit board 15 shown in FIG. 3. The inner circuit 40 includes a separating circuit 43, a rectifying circuit 44, a capacitor 45, a regulator 66, a charging-voltage control unit 47. Furthermore, as shown in FIG. 4, in the inner circuit 40 of the mobile phone unit 2, the illustration and the description of the circuit configuration for an information exchange between the inner circuit 40 and the cradle 1 are omitted herein.

The rectifying circuit 44 converts an output voltage (alternating voltage) between the coil ends of the secondary transmission coil 14 into a direct current voltage and then transmits the converted voltage to a regulator 66.

The regulator 66 converts a direct current voltage supplied from the rectifying circuit 44 into a predetermined voltage used in the mobile phone unit-charging circuit 48 and then transmits the converted voltage to a charging-voltage control unit 47.

The separating circuit 43 is provided between one of the coil ends of the secondary transmission coil 14 and the rectifying circuit 44. Usually, the separating circuit 43 maintains an electrical connection between the secondary transmission coil 14 and the rectifying circuit 44. When a separation signal is supplied from the charging-voltage control unit 47, the electrical connection between the secondary transmission coil 14 and the rectifying circuit 44 is completely broken.

In addition, a voltage-dividing resistor 42 is connected between the coil ends of the secondary transmission coil 14. The voltage-diving resistor 42 divides a voltage between the coil ends of the secondary transmission coil 14. The voltage-diving resistor 42 then supplies a voltage-diving output to a charging-voltage control unit 47. Simultaneously, the voltage-diving resistor 42 divides the abnormally high voltage generated between both the coil ends when the secondary transmission coil 14 is subjected to a strong magnetic field, such as an induction heating cooker. Therefore, the voltage-diving resistor 42 is provided in order to avoid the use of any high resistance voltage circuit for a subsequent voltage comparator 50 and others. The voltage-dividing resistor 42 divides the voltage between the both ends of the secondary transmission coil into, for example ½ or ⅓.

The charging-voltage control unit 47 includes a control circuit 49, a voltage comparator 50, and a voltage detector 51 as principal components.

The voltage detector 51 transmits a voltage level data to a control circuit 49. In this case, the voltage level data is obtained by A/D conversion of a divided value between the coil ends of the secondary transmission coil 14 obtained from the voltage-dividing resistor 42 and then transmitted to the control circuit 49.

The control circuit 49 determines whether the voltage level data from the voltage detector 51 is within a previously determined standard voltage range. If the voltage level data from the voltage detector 51 is within the standard voltage range, a charging voltage is supplied from the regulator 66 to the mobile phone unit-charging circuit 48. On the other hand, if the voltage level data is out of the standard voltage range, then the supply of charging voltage from the regulator 66 to the mobile phone unit-charging circuit 48 is controlled so as not to be carried out.

The voltage comparator 50 makes a comparison between a divided voltage level between the coil ends of the secondary transmission coil 14 obtained from the voltage-dividing resistor 42 and a previously-defined reference voltage level for detecting an abnormally high voltage level. If the divided voltage level from the voltage-dividing resistor 42 exceeds the reference voltage level, then a separation signal is output to the separating circuit 43. The separation signal is to completely break the electrical connection between the secondary transmission coil 12 and the rectifying circuit 44. Here, the above reference voltage level is a previously defined value depending on the resistance voltage of an electronic circuit subsequent to the rectifying circuit 44. For example, it is desirable to define the voltage level corresponding to the electronic circuit subsequent to the rectifying circuit 44 as follows. It is to be at least lower than a voltage level obtained by dividing voltage with the same resistance ratio as that of the voltage-dividing resistor 42. In addition, it is to be at least higher than the maximum voltage generated by the secondary transmission coil 14 at the time of normal noncontact power transmission.

Furthermore, if an output voltage level from the voltage-dividing resistor 42 exceeds the reference voltage level for detecting an abnormally high voltage level, the voltage comparator 50 may transmit the information about such a fact to the control circuit 49. In this case, the control circuit 49 makes a control such that the supply of charging voltage from the regulator 66 to the mobile phone unit-charging circuit 48 is interrupted.

However, a time lag slightly exists until the separating circuit 43 is actuated by a separation signal output from the voltage comparator 50. During the time lag, an abnormally high voltage level is output from the rectifying circuit 44 to the regulator 66. Accordingly, the mobile phone unit of the present embodiment includes a direct-current capacitor 45 placed between the rectifying circuit 44 and the regulator 66. The direct-current capacitor 45 has a sufficient capacity to accumulate electric power output from the rectifying circuit 44 during such a time lag as much as possible. In other words, in the mobile phone unit of the present embodiment, the direct-current capacitor 45 retains the electric power during the time lag until the separating circuit 43 is actuated. Therefore, the output of an unusual voltage to any circuit subsequent to the regulator 66 can be prevented.

Furthermore, in the case of the example illustrated in FIG. 4, the voltage comparator 50 makes a comparison between the output level of the voltage-dividing resistor 42 and the reference voltage level. Alternatively, the comparison may be made between the output voltage level from the voltage detector 51 and the reference level.

[Detailed Inner Configurations of Separating Circuit and Voltage Comparator]

Figure 5:
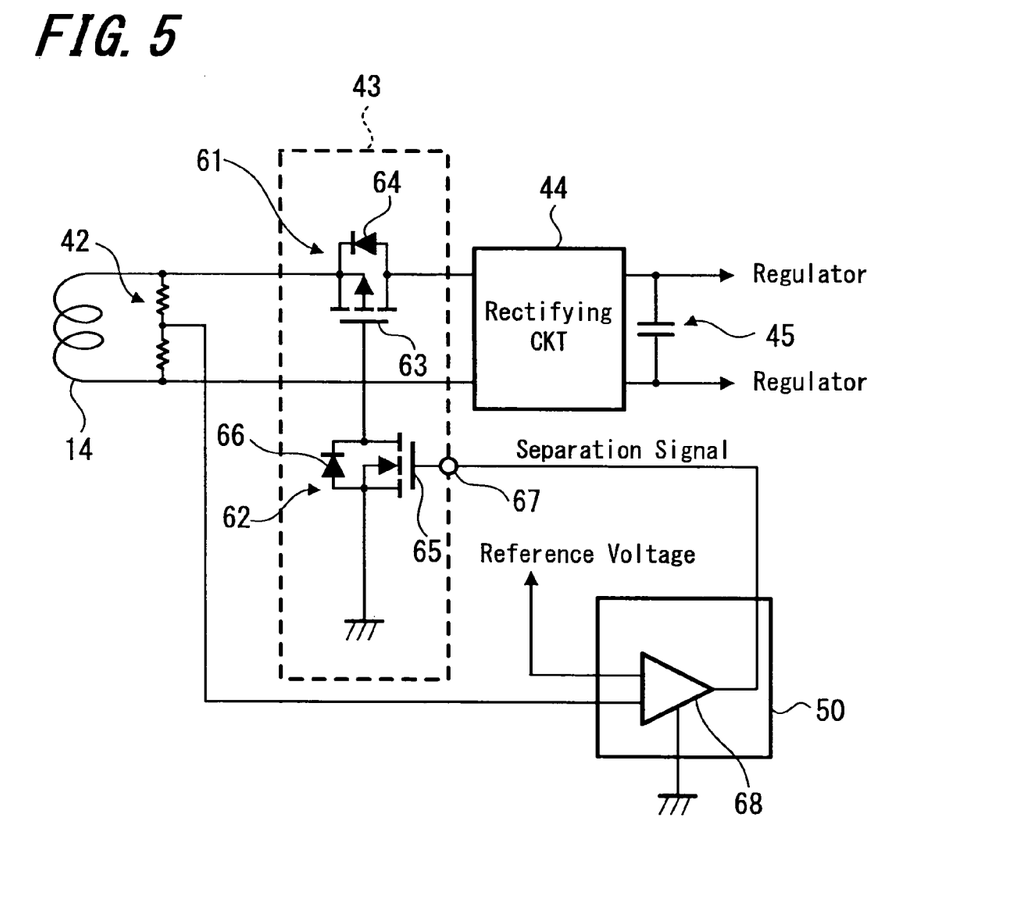
FIG. 5 is a circuit diagram illustrating an example of a detailed inner configuration of a separating circuit and a voltage comparator shown in FIG. 4.

FIG. 5 illustrates an example of a detailed inner configuration of each of the separating circuit 43 and the voltage comparator 50. As shown in FIG. 5, the same components as those in FIG. 4 are provided with identical reference numerals and the detailed descriptions thereof are omitted, respectively.

As shown in FIG. 5, the separating circuit 43 includes a first switching circuit 61 and a second switching circuit 62. The first switching circuit 61 includes a MOS transistor 63 and a backflow-preventing diode 64. The second switching circuit 62 also includes a MOS transistor 65 and a backflow-preventing diode 66.

In the first switching circuit 61, the drain-source of the MOS transistor 63 is connected between the secondary transmission coil 14 and the rectifying circuit 44. In the second switching circuit 62, the drain-source of the MOS transistor 65 is connected between the gate and ground (earth) of the MOS transistor 63 of the first switching circuit 61. In addition, the diode 64 of the first switching circuit 61 includes a cathode on the side of the secondary transmission coil 14 and an anode on the side of the rectifying circuit 44. Both the cathode and the anode are connected between the drain and the source of the MOS transistor 63. In addition, in the case of the diode 66 of the second switching circuit 62, the cathode is provided on the gate side of the MOS transistor 63 of the first switching circuit 61 and the anode is provided on the ground side. They are connected between the drain and the source of the MOS transistor 65. Furthermore, the gate of the MOS transistor 65 of the second switching circuit 62 is connected to a separation-signal output terminal of the voltage comparator 50 through a separation-signal input terminal 67.

Furthermore, the voltage comparator 50 includes an input comparator 68. One of the input terminals of the comparator 68 is connected to the voltage-dividing output terminal of the voltage-dividing resistor 42. The other input terminal receives the supply of a reference voltage level for detecting the abnormally high voltage level from a reference-voltage generator (not shown). For example, the reference voltage generator generates a reference voltage level for detecting the abnormally high voltage level using electric power from the internal battery of the mobile phone unit, or the like. In addition, an output terminal of the comparator 68 of the voltage comparator 50 is connected to the gate of the MOS transistor 65 of the second switching circuit 62 through the separation-signal input terminal 67 of the separating circuit 43.

In the configurations shown in FIG. 5, the comparator 68 of the voltage comparator 50 outputs a switching signal (separation signal). In other words, the output voltage level between the coil ends of the secondary transmission coil 14 obtained from the voltage-dividing resistor 42 is compared with the reference voltage revel from the reference-voltage generator. If the output voltage level from the voltage-dividing resistor 42 exceeds the reference voltage level, then the switching signal (separation signal) that turns on the MOS transistor 65 of the second switching circuit 62 of the separating circuit 43 is output. If the MOS transistor 65 of the second switching circuit 62 turns on, then the MOS transistor 63 of the first switching circuit 61 is switched off (nonconduction state) from on (conductive state) in normal times. Consequently, an electric connection between the secondary transmission coil 14 and the rectifying circuit 44 can be completely interrupted.

Furthermore, although not shown in FIG. 5, the information about the output of the comparator 68 of the voltage comparator 50 may be supplied to the control circuit 49 shown in FIG. 4. In other words, the information representing whether the output level of the voltage-dividing resistor 42 exceeds the reference voltage level for detecting the abnormally high voltage level is supplied.

[Another Embodiment of Voltage-Dividing Resistor and Coil for Detecting Abnormally High Voltage Level]

In the above description of the embodiment, whether an abnormally high voltage level is detected in the voltage comparator 50 is determined using a divided voltage level between both coil ends of one secondary transmission coil 14. Alternatively, as exemplified in an embodiment shown in FIGS. 6 to 8, an abnormally high voltage level-detecting coil 52 is prepared in addition to the secondary power-transmission coil 14. A voltage level between the coil ends of the coil 52 may be employed to allow the voltage comparator 50 to make an determination whether an abnormally high voltage level is detected.

Figure 6:
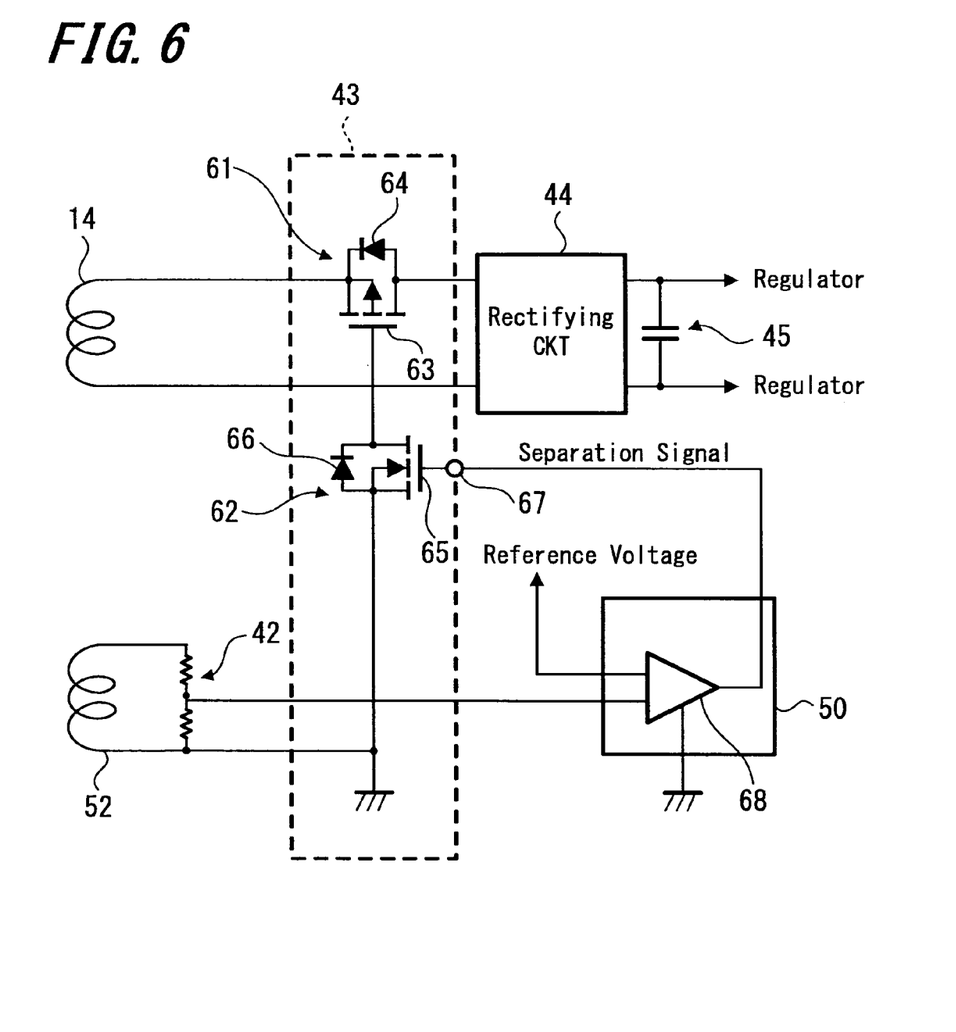
FIG. 6 is a circuit diagram illustrating an example of detailed inner configurations of a separating circuit, a voltage comparator, a secondary power-transmission coil and a abnormally-high voltage level detecting coil.

FIG. 6 illustrates an example of detailed inner configurations of a separating circuit 43, a voltage comparator 50, and also the secondary power-transmission coil 14 and the abnormally high voltage level-detecting coil 52.

As shown in FIG. 6, the same components as those in FIG. 5 are provided with identical reference numerals and the detailed descriptions thereof are omitted, respectively.

In the present embodiment, as shown in FIG. 5, the coil 14 has one of coil ends, which is connected to the rectifying circuit 44 through the separating circuit 43. However, in this embodiment, a voltage-dividing resistor is not connected between the both coils ends in the secondary power-transmission coil 14.

On the other hand, in this embodiment, the voltage-dividing resistor 42 is connected between the coil ends of the coil 52. The output terminal of the voltage-dividing resistor 42 is connected to one of the input terminals of a comparator 68 of the voltage comparator 50.

Here, the secondary power-transmission coil 14 and the abnormally high voltage level-detecting coil 52 may be spiral planar coils independently formed. In the present embodiment, for example, as shown in FIG. 7 and FIG. 8, the coils may be formed as spirally-shaped planar coils sharing one central axis with each other.

Figure 7:
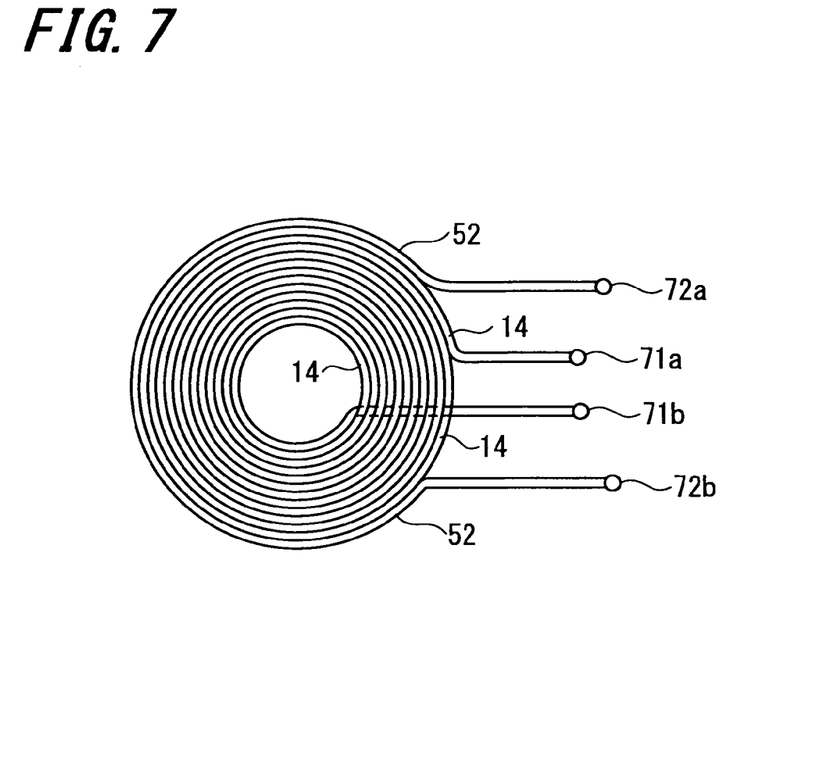
FIG. 7 is a schematic diagram illustrating a schematic configuration of a spiral planar coil in which one outermost peripheral winding portion is provided for an abnormally-high voltage level detecting coil and a plurality of inner peripheral winding portions is provided for a secondary power-transmission coil.
Figure 8:
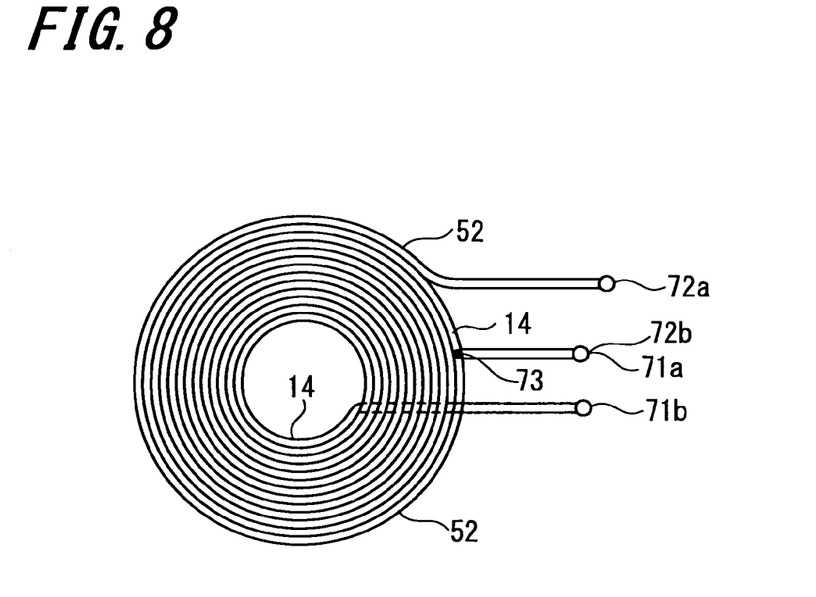
FIG. 8 is a schematic diagram illustrating a configuration of a spiral coil where a secondary power-transmission coil and a abnormally-high voltage level detecting coil are provided by sharing a single coil.

FIG. 7 illustrates an example in which the outermost-peripheral one-winding portion is provided as the abnormally high voltage level-detecting coil 52 and the inner-peripheral several-winding portion is provided as the secondary power-transmission coil 14.

In the example shown in FIG. 7, the coil ends of the coil 52 are connected to the respective connection terminals 72*a*, 72*b*. The coil ends of the coil 14 are connected to the respective connection terminals 71*a*, 71*b*. In the example shown in FIG. 7, the connection terminals 72*a*, 72*b* on the abnormally high voltage-level detecting coil 52 are connected to the voltage-dividing resistor 42 shown in FIG. 6, respectively. One of the connection terminals 71*a*, 71*b* of the secondary power-transmission coil 14 is connected to the rectifying circuit 44 through the separating circuit 43 shown in FIG. 6.

In other words, in the example shown in FIG. 7, the secondary power-transmission coil 14 and the abnormally high voltage level-detecting coil 52 are formed of spiral planar coils with a shared central axis with each other. Therefore, according to the present embodiment, comparing with one having independently-formed coils, space can be saved.

Furthermore, in the case of an example shown in FIG. 7, the number of windings of the abnormally high voltage-level detecting coil 52 is smaller than the number of windings of the secondary power-transmission coil 14. Hence, for example, the voltage generated between the coil ends of the coil 52 may be smaller than in the case of the divided voltage level between the coil ends of the secondary power-transmission coil 14 as shown in an example of FIG. 5, even if exposed to a strong magnetic field caused by induction heating cooker. Therefore, the resistance voltage of the voltage comparator 50 subsequent to the coil 52 can be low. As a result, the inexpensive and small-size voltage comparator 50, compared with an example shown in FIG. 5, can be used.

In the example shown in FIG. 7, one outermost peripheral winding portion is used as the abnormally high voltage level-detecting coil 52. Alternatively, for example, one innermost peripheral winding portion may be used as the abnormally high voltage level-detecting coil 52 and a plurality of outer peripheral winding portions may be used as the secondary power-transmission coil 14. In addition, the number of windings of the abnormally high voltage level-detecting coil 52 is not limited to a single winding but two or more windings may be used. However, if the number of windings of the abnormally high voltage level-detecting coil 52 is excess, a power transmission efficiency of the secondary power-transmission coil 14 may be deteriorated with respect to the dimensions of the spiral planar coil. Accordingly, it is desirable that the number of windings of the abnormally high voltage level-detecting coil 52 be small.

FIG. 8 shows an example of obtaining both the secondary power-transmission coil 14 and the abnormally high voltage level-detecting coil 52, while sharing a single spiral planar coil.

In the example shown in FIG. 8, almost one winding portion from the outermost peripheral coil end of the spiral planar coil to the contact portion 73 is used as the abnormally high voltage level-detecting coil 52. In addition, a plurality of windings from the contact portion to the innermost peripheral portions is used as the secondary power-transmission coil 14. Here, in the case of the example shown in FIG. 8, one of the connection terminals 72*a* for the detection of an abnormally high voltage level is connected to the coil end on the outer peripheral coil end of the spiral planar coil. The other connection terminal 72*b* for the detection of an abnormally high voltage level is connected to the contact portion 73. In addition, the other connection terminal 71*b* for electric power transmission is connected to the innermost coil end of the spiral planar coil and one connection terminal 71*a* for electric power transmission is connected to the above contact portion 73. In other words, in this case, the connection terminals 71*a* and 72*b* connected to the contact portion 73 are shared with the electric power transmission and the detection of an abnormally high voltage.

In the example shown in FIG. 8, both the secondary power-transmission coil 14 and the abnormally high voltage level-detecting coil 52 are formed while sharing a single spiral planar coil. Therefore, comparing with one having independently-formed coils, space can be saved according to the present embodiment. In addition, the connection terminals are shared with one for the power transmission and one for the detection of an abnormally high voltage level. Consequently, the number of parts can be further reduced compared with the example shown in FIG. 7.

Furthermore, in the example of FIG. 8 in a manner similar to FIG. 7, the number of windings of the abnormally high voltage level-detecting coil 52 may be smaller than the number of windings of the secondary power-transmission coil 14. In this case, for example, the voltage generated in the abnormally high voltage level-detecting coil 52 at the time of being exposed to a strong magnetic field, such as an induction heating cooker, is lower than that of the example shown in FIG. 5. Therefore, the voltage comparator 50 may be any of those having a comparatively low resistance volume. Furthermore, in the example of FIG. 8, for example, almost one innermost winding portion may be used as the abnormally high voltage level-detecting coil 52. In contrast, a plurality of the outer peripheral winding portions may be used as the secondary power-transmission coil 14. Alternatively, the number of windings of the abnormally high voltage level-detecting coil 52 may be two or more. In consideration of an installing space and power-transmission efficiency with the secondary power-transmission coil 14, it is desirable that the number of windings of the abnormally high voltage level-detecting coil 52 be small.

[Summary]

As described above, according to the embodiments of the present invention, the voltage of a secondly coil in a noncontact powder is detected. If the detected voltage exceeds the reference voltage for detecting the abnormally high voltage level, an electric connection between the secondary transmission coil and the subsequent circuit configuration is completely interrupted by the separating circuit 43. For example, even if exposed to a strong magnetic field of the induction heating cooker, the inner circuit of the mobile phone unit can be protected from being destroyed.

Furthermore, according to the embodiments of the present invention, the capacitor 45 is formed directly after the rectifying circuit 44 subsequent to the separating circuit 43. Electric power generated during a time lag from the detection of an abnormally high voltage level to the break of connection with the separating circuit 43 is accumulated in the capacitor 45 to prevent the unusual voltage from being output to the subsequent circuits during the time lag.

Furthermore, according to the embodiments of the present invention, the secondary coil in the noncontact power transmission is divided into the secondary power-transmission coil 14 and the abnormally high voltage level-detecting coil 52. Hence, it is possible to obtain a reduction in an installing space, a reduction in costs of a voltage comparator subsequent to the coil, and a size reduction.

The description of each of the aforementioned embodiments is only an example of the present invention. Therefore, the present invention is not limited to each of these embodiments. Various changes are possible as far as these changes are within the range that does not deviate from the gist of the present invention.

In the aforementioned embodiments, the protection of the inner circuit of the mobile phone unit 2 from the abnormally high voltage level is exemplified. According to the embodiment of the present invention, such a protection may be applied to the cradle 1

Furthermore, the mobile phone unit 2 and the cradle 1 have been exemplified for describing the embodiments of the present invention. However, the present invention is not limited to these examples. For example, the present invention will be applied to various kinds of electronic device and their respective cradles such as personal digital assistants (PDAs).

Furthermore, the present invention is not limited to the use of transmitting charging voltage. The present invention will be applied in any of electronic devices that may cause high electric powers not less than resistance voltages of inner circuits when subjected to a strong magnetic field or the like, such as a noncontact IC card provided with a loop shaped antenna or a spiral antenna.

It should be understood by those skilled in the art that various modifications, combinations, sub-combinations, and alterations may occur, depending on design requirements and other factors, insofar as they are within the scope of the appended claims or the equivalents thereof.

What is claimed is:

1. An electronic device having at least a loop-shaped electric conductor generating electric power by electromagnetic induction, comprising:
    a voltage-detecting unit configured to detect a voltage generated in the electric conductor by the electromagnetic induction;
    a voltage-comparing unit configured to make a comparison between the voltage detected by the voltage-detecting unit and a predetermined reference voltage and determining whether the voltage detected by the voltage-detecting unit exceeds the predetermined reference voltage; and
    a separating unit configured to break an electric connection between the electric conductor and an electronic circuit connecting to the electric conductor when the voltage-comparing unit determines that the voltage detected by the voltage-detecting unit exceeds the predetermined reference voltage.

2. A electronic device according to claim 1, further comprising:
    a power-accumulating unit configured to accumulate electric power generated from the electric conductor within a time period from the voltage detected by the voltage-detecting unit exceeding the predetermined reference voltage to the separating unit breaking the electric connection between the above electric conductor and the electronic circuit.

3. A electronic device according to claim 2, further comprising:
    a rectifying unit configured to convert an alternating voltage generated in the electric conductor by the electromagnetic induction to a direct current voltage,
    wherein the power-accumulating unit is a direct-current capacitor provided between the rectifying unit and the electronic circuit.

4. A electronic device according to claim 1, further comprising:
    a voltage-dividing unit configured to divide the voltage generated in the electric conductor by the electromagnetic induction at a predetermined ratio,
    wherein the voltage-detecting unit detects the voltage divided by the voltage-dividing unit, and the voltage-comparing unit makes a comparison between the divided voltage detected by the voltage-detecting unit and the predetermined reference voltage.

5. The electronic device according to claim 1,
    wherein the electric conductor includes
    a power-transmission electric conductor for carrying out noncontact power transmission using electromagnetic induction; and a voltage-detection electric conductor for supplying the voltage generated from the electromagnetic induction to the voltage-detecting unit.

6. A electronic device according to claim 5,
    wherein at least the power-transmission electric conductor is a planar coil formed by spirally winding a linear conductor, and wherein the voltage-detection electric conductor is a planar coil formed of at least a loop-shaped linear conductor sharing a common central axis with the planar coil of the power-transmission electric conductor.

7. A electronic device according to claim 5,
    wherein at least the power-transmission electric conductor is a planar coil formed by spirally winding a linear conductor, and
    wherein the voltage-detection electric conductor is a planar coil formed of at least a loop-shaped linear conductor sharing a part of the linear conductor that forms a planner coil of the power-transmission electric conductor with the power-transmission electric conductor.

8. A electronic device according to claim 5, further comprising:
    a voltage-dividing unit configured to divide the voltage generated in the voltage-detection electric conductor by the electromagnetic induction at a predetermined ratio, wherein
    the voltage-detecting unit detects the voltage divided by the voltage-dividing unit, and
    the voltage-comparing unit makes a comparison between the divided voltage detected by the voltage-detecting unit and the predetermined reference voltage.

9. A electronic device according to claim 1, wherein the separating unit includes a switching circuit configured to make a switch of electric conduction state/non-conduction state between the electric conductor and the electronic circuit, and wherein the voltage-comparing unit outputs a switching signal, for switching the electrical connection between the electric conductor and the electronic circuit to the non-conduction state, to the switching circuit, when the voltage detected by the voltage-detecting unit exceeds the predetermined reference voltage.

10. A electronic device according to claim 9,
wherein the switching circuit of the separating unit includes a first switching circuit connected between the electric conductor and the electronic circuit and a second switching circuit for making a switch of electric conduction state/non-conduction state by the first switching circuit, and
wherein the voltage-comparing unit outputs a switching signal, for switching the electrical connection caused by the first switching circuit to the non-conduction state, to the second switching circuit when the voltage detected by the voltage-detecting unit exceeds the predetermined reference voltage.

11. An electronic power-transmission device comprising:
a loop-shaped electric conductor configured to generate electric power by electromagnetic induction;
a voltage-detecting unit configured to detect a voltage generated in the electric conductor by the electromagnetic induction;
a voltage-comparing unit configured to compare the voltage detected by the voltage-detecting unit and a predetermined reference voltage and determine whether the voltage detected by the voltage-detecting unit exceeds the predetermined reference voltage; and
a separating unit configured to break an electric connection between the electronic conductor and an electronic circuit connected to the electric conductor in the case that the voltage-comparing unit determines that the voltage detected by the voltage-detecting unit exceeds the predetermined reference voltage.

12. An electronic device according to claim 11, further comprising:
a power-accumulating unit configured to accumulate electric power generated from the electric conductor within a time period beginning when the voltage detected by the voltage-detecting unit exceeds the predetermined reference voltage to when the separating unit breaks the electric connection between the electric conductor and the electronic circuit.

13. An electronic device according to claim 12, further comprising:
a rectifying unit configured to rectify an alternating voltage generated in the electric conductor by the electromagnetic induction to a direct current voltage,
wherein the power-accumulating unit is a direct-current capacitor provided between the rectifying unit and the electronic circuit.

14. An electronic device according to claim 11, further comprising:
a voltage-dividing unit configured to divide the voltage generated in the electric conductor by the electromagnetic induction at a predetermined ratio,
wherein the voltage-detecting unit detects the voltage divided by the voltage-dividing unit, and the voltage-comparing unit makes a comparison between the divided voltage detected by the voltage-detecting unit and the predetermined reference voltage.

15. An electronic device according to claim 11,
wherein the electric conductor includes
a power-transmission electric conductor for carrying out noncontact power transmission using electromagnetic induction; and
a voltage-detection electric conductor for supplying the voltage generated from the electromagnetic induction to the voltage-detecting unit.

16. An electronic device according to claim 15,
wherein the power-transmission electric conductor is a planar coil formed of at least a first spirally wound linear conductor, and
wherein the voltage-detection electric conductor is a planar coil formed of at least a loop-shaped linear conductor sharing a common central axis with the planar coil of the power-transmission electric conductor.

17. An electronic device according to claim 15,
wherein the power-transmission electric conductor is a planar coil formed of at least a second spirally wound linear conductor, and
wherein the voltage-detection electric conductor is a planar coil formed of at least a loop-shaped linear conductor sharing a part of the linear conductor that forms a planner coil of the power-transmission electric conductor with the power-transmission electric conductor.

18. An electronic device according to claim 15, further comprising:
a voltage-dividing unit configured to divide the voltage generated in the voltage-detection electric conductor by the electromagnetic induction at a predetermined ratio, wherein
the voltage-detecting unit detects the voltage divided by the voltage-dividing unit, and
the voltage-comparing unit makes a comparison between the divided voltage detected by the voltage-detecting unit and the predetermined reference voltage.

19. An electronic device according to claim 11,
wherein the separating unit includes a switching circuit configured to make a switch of electric conduction state/non-conduction state between the electric conductor and the electronic circuit, and
wherein the voltage-comparing unit outputs a switching signal, for switching the electrical connection between the electric conductor and the electronic circuit to the non-conduction state, to the switching circuit, in the case that the voltage detected by the voltage-detecting unit exceeds the predetermined reference voltage.

20. An electronic device according to claim 19,
wherein the switching circuit of the separating unit includes a first switching circuit connected between the electric conductor and the electronic circuit and a second switching circuit for making a switch of electric conduction state/non-conduction state by the first switching circuit, and
wherein the voltage-comparing unit outputs a switching signal, for switching the electrical connection caused by the first switching circuit to the non-conduction state, to the second switching circuit in the case that the voltage detected by the voltage-detecting unit exceeds the predetermined reference voltage.

* * * * *